Aug. 12, 1969     I. GOLDMAN     3,460,788

CLAMP LATCH

Filed Oct. 2, 1967

INVENTOR.
ISRAEL GOLDMAN
BY Robert Q. Richardson
ATTORNEY.

United States Patent Office 3,460,788
Patented Aug. 12, 1969

3,460,788
CLAMP LATCH
Israel Goldman, Los Angeles, Calif., assignor to McDonnell Douglas Corporation, a corporation of Maryland
Filed Oct. 2, 1967, Ser. No. 672,112
Int. Cl. F16l *3/08, 3/14*
U.S. Cl. 248—74                                     2 Claims

ABSTRACT OF THE DISCLOSURE

An improved latch consisting of inter-engaging tabs on the feet of a clamp for temporarily retaining the clamp in closed position around the elongated members to be supported thereby when affixed to a supporting structure.

Background of the invention

There are many varieties of clamps for supporting elongated items of a general nature, such as, for example, single or multiple electrical conductors, hydraulic tubing, rods, and the like, which extend from an originating station, such as a power supply, battery, pump, generator, and other energy sources, to points or locations where such energy is utilized. These clamps for retaining the elongated items, typically, are used on aircraft, automobiles, boats, tanks missiles and other moving vehicles, as well as nonmovable structures, such as buildings, cabinets, containers, or housings. One such clamp consists of a loop terminating in substantially juxtapositioned and parallel feet at both ends of the loop. After placing the elongated items within the loop, the feet are pressed together to secure the clamp around the elongated items. Apertures in the feet are then aligned and a screw is inserted therethrough for fastening the clamp to a supporting structure upon which the elongated items are to be mounted.

Some of the loops are resilient and have a present condition wherein the feet of the clamp are spaced apart and pressure must be exerted in closing the clamp. Other loops are flexible but not resilient, but still require pressure in engaging the loop tightly around a bundle of elongated items to secure them within the loop and to draw the two feet together for mounting to a support structure. Both kinds of clamps present a problem to the operator who must retain the two feet in aligned position, apply pressure therebetween and insert a bolt through the apertures and into a support structure and, thereafter, tighten up such bolt to securely retain the elongated items within the loop of the clamp. This problem is increasingly difficult as the loop is drawn tightly around the elongated items which have a tendency to slip from the loop into the area between the two feet. When a multiple of such clamps are used and supported on one mounting structure, the problem multiplies accordingly. Some clamps have a resilient cushion lining within the loop to protect the items from direct contact and abrasion by the loop portion of the clamp. A filler wedge may be included at one end of the loop to prevent one or more of the items from being forced through the ends of the clamp or the lining as the clamp is tightened.

In the past, this problem of retaining the items within the loop has been solved with a latching means for holding the feet of the clamp together prior to mounting the clamp on the support structure. However, these latching means required a greater compression and tightening of the loop around the elongated items for the latch to become engaged than is required when the clamp is installed. This causes an undue compression upon the elongated items and the partial release when installed creates a looseness of fit of the loop of the clamp around the elongated items. Other clamps have other latching means for retaining the feet of the clamp in fixed position, and thus retain the elongated items within the loop. One such clamp is disclosed in Patent No. 2,338,006 to Eugene M. Morehouse for Supporting Clip for Conduits. Here a clasp or catch means holds the feet together, the object of the present invention. However, as can be seen in the drawings in the Morehouse patent, the feet portions have enlarged areas laterally or longitudinally that must be cut and bent to the desired shape. This results in a waste of material as a multiple of clamps are laid out on a sheet of material for punching or stamping out of the blanks from which the clamps are then formed. Moreover, the latching features of the Morehouse patent do not lend themselves to the convention mass-produced clamp made from straps of material whose widths correspond to the width of the loop and feet of the finished clamp.

Summary of the invention

In accordance with the present invention, an interengaging latch means is provided on the feet of a clamp of the type having substantially juxtapositioned and parallel apertured feet. This latch means temporarily retains the feet in contact with each other and with the apertures aligned to enable attachment of one or a plurality of clamps to a supporting structure. This latching means consists of tabs, struck from both feet, which cooperatively engage each other upon a lateral displacement of, and pressure on, the feet. In attaching several clamps to the same support, this eliminates the awkward, delicate and time-consuming task of retaining the feet of all clamps with their apertures in alignment for the insertion of the single fastening device therethrough for fastening all the clamps to the support.

A primary object of the present invention is to provide an improved latch for an annular clamp of the type having substantially juxtapositioned and parallel apertured feet, wherein the latch temporarily retains the feet in contact with each other and the apertures of the feet in alignment to enable a simple, accurate and reliable attachment of the clamp to a supporting structure. Another object is the provision of interengaging latch means for a clamp made from strap stock substantially the width of the clamp loop and feet.

Another object is the provision of a locking clamp latch which locks the feet of an annular clamp in juxtaposition by operation thereof with a lateral motion by the operator instead of by further compression of the loop to engage and disengage the latching elements.

Other objects will become more apparent as the description of this invention proceeds, now having reference to the drawing, wherein:

Figure 1:
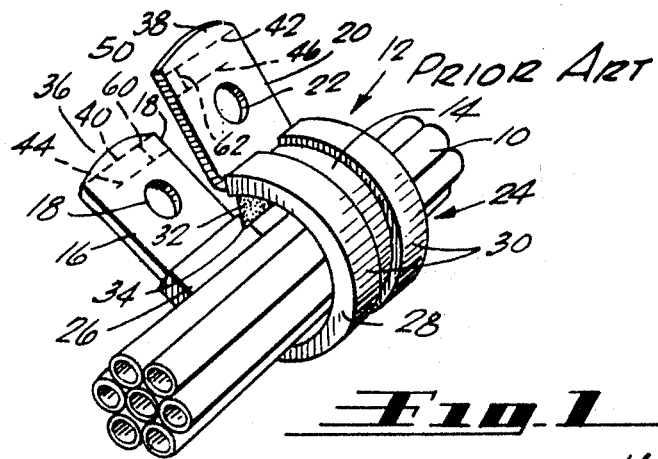
FIGURE 1 is an isometric view showing a prior art supporting clamp in association with a bundle of elongated items.

Referring now to the prior art device, shown in FIG. 1 there is shown a bundle of elongated items 10 around which has been placed a clamp 12 consisting of a loop 14 having at one end thereof and extending as integral portion thereof, a foot 16 having an aperture 18 centrally located therein. The other end of loop 14 has a similar foot 20 extending angularly relative to the curvature of loop 14 in order to be juxtapositioned with foot 16 for alignment therewith. This foot has an aperture 22 adapted for alignment with aperture 18 in foot 16 for the passage of a fastener therethrough to tighten loop 14 around the elongated items 10. Loop 14 is preferably resilient and normally in the preset position, as shown. The feet are spaced apart for ease in inserting elongated items therebetween. However, loop 14 may also be flexible, if desired, depending upon the use to which it is put.

A flexible, compressible lining 24 encompasses loop 14 to hold the elongated items 10 snugly and to prevent excessive wear by their contact with the loop. This lining consists of a flat inner surface 26 terminating in side portions 28 from which outer covers 30 project toward each other across the outer face of the loop 14. A filler wedge 32 is attached to one end of the flat inner surface 26 in such manner that one surface of the wedge abuts thereagainst and the apex 34 is directed inwardly of the loop. This apex 34 abuts against the inner surface 26 at the other end of lining 24 when feet 16 and 20 are joined together to prevent any of the items 10 from being compressed between the feet. The construction, installation and purpose of this lining 24 can best be understood with reference to Patent Number 2,692,746 of H. P. Thomas for a Supporting Clip. This patent is directed to the filler wedge and resilient lining for the cushioning and positioning of a multiplicity of wires with a clamp mounted on a support.

The prior art clamp 12 just shown and described is typical of the type of clamp which may readily incorporate the improved latching feature of the present invention. In adapting this clamp 12, its rounded ends 36, 38 of feet 16 and 20 are cut along dashed lines 40 and 42 which extend laterally completely across the width of the feet. The curved end portions are then discarded. The next step is to cut a slit laterally across approximately three-fourths of the width of the feet along dashed lines 44 and 46. As shown, these lines are spaced inwardly from and parallel to the dashed lines 40, 42. In the view, as shown in FIG. 1, line 44 extends laterally across about three-fourths the width of foot 16 commencing from edge 48, shown as the right hand edge in FIG. 1. The dashed line 46 on foot 20 entends laterally across approximately three-fourths the width of foot 20 from the left-hand edge 50. As will be explained hereinafter, dash lines 60, 62 may be cut to foreshorten the latching tabs.

Figure 2:
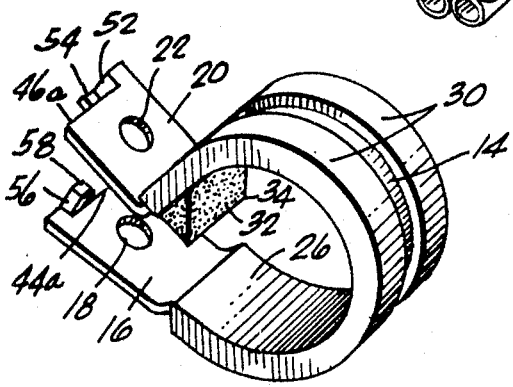
FIG. 2 is an isometric view of the clamp of the present invention showing the improved latching elements in an open position.
Figure 3:
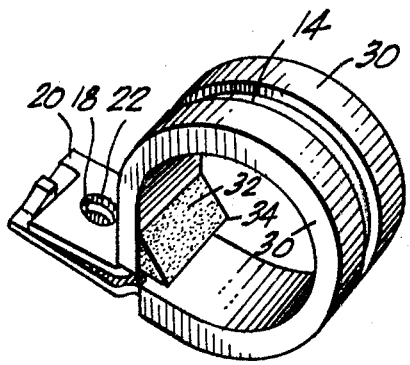
FIG. 3 is an isometric view similar to FIG. 2 and showing the latching elements in a fastened position.
Figure 4:
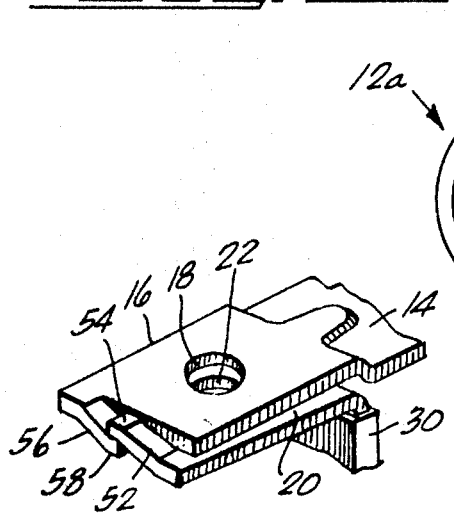
FIG. 4 is an enlarged, fragmentary isometric view of the latching elements of the invention.

The formation of latching tabs from the ends of the feet 16 and 20 can best be understood now with reference to the improvement as shown in FIGS. 2, 3 and 4 where like numbers, corresponding to those in FIG. 1, represent the same features as shown in the prior art device in FIG. 1. As can be seen in FIG. 2, the dashed line 46 in FIG. 1 becomes edge 46A in FIG. 2 and the dashed line 44 in FIG. 1 becomes edge 44A in FIG. 2. The strip defined by the dashed lines 42 and 46 in FIG. 1 is bent to form an incline 52 and tab 54, and the strip defined by dashed lines 40 and 44 in FIG. 1 is bent to form the incline 56 and tab 58 in FIG. 2. The incline portions 52 and 56 are at such angle and such length that tabs 54 and 58 may interlock, as shown in FIG. 3.

As can be seen in FIG. 4, tab 54 preferably lies in the same plane as foot 16 and tab 58 lies in the same plane as foot 20 when the feet are locked. When interlocked, the tabs maintain loop 14 in closed position with feet 16 and 20 in juxtaposed position and with apertures 18 and 22 aligned for the insertion therethrough of a fastening element for installation. Depending upon the width of the feet from which the latching tabs and inclines are formed, it may be desirable to shorten the lateral length of the tabs somewhat and thereby reduce the amount of lateral pressure on the feet that is necessary for the engagement and disengagement of the associated tabs. The lengths of tabs 54 and 58 may be shortened by cutting off their ends, such as along dashed lines 60 and 62 in FIG. 1, for example. This reduces the amount of lateral movement of the feet 16, 20 required to lock and unlock the latching elements. In latching the feet of the clamp together after the clamp has been placed over the elongated items, the operator first compresses the feet together until the adjacent faces of tabs 54 and 58 abut each other. Thereafter a lateral pressure is exerted on the feet until the ends of the tabs clear each other and further compressive movement causes the edges 44A and 46A of the two feet to make contact. Lateral pressure on the feet in the reverse lateral direction then aligns the feet with the tabs hooked in overlapping relation, as shown in FIGS. 3 and 4. The apertures on the feet are in alignment also.

After having locked the feet of the clamp together, the unlocking of the feet to remove the clamp from the elongated items should be obvious to the operator. Lateral pressure on the feet in a direction to free the tabs from interlocking contact is all that is required. Thereafter the resiliency of the loop springs it back to its preset position with the feet spaced apart. If the loop is flexible but not resilient, the feet may be pried apart manually.

Figure 5:
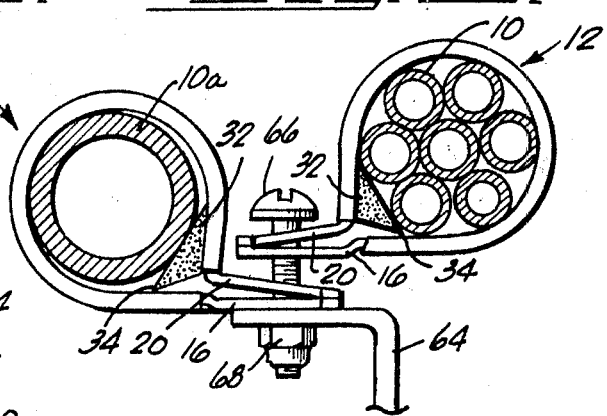
FIG. 5 is an end view showing a typical installation of the present clamps while still loosely connected to a common support.

Reference is now made to FIG. 5 which shows clamps 12 and 12A with their feet locked by the latching elements of the present invention for securing elongated items 10 and 10A within their loops prior to installation on structural support 64. After the elements have been secured within the loops of the clamps and the feet securely positioned by their respective latching elements, bolt 66 is placed through the aligned apertures in the feet of the clamps and the supporting structure. Nut 68 is then placed on the end of the bolt and tightened. As can be seen, wedges 32 interconnect the ends of the loop to prevent the elongated items from wedging between the feet 16, 20 of the clamp before the bolt 66 and nut 68 are tightened to thereby secure the clamps in their intended fixed position on the support structure 64.

Having thus described an illustrative embodiment of the present invention, it is to be understood that other forms will readily appear to those skilled in the art and it is to be further understood that such deviations and modifications of the form just described are to be considered as part of the invention.

I claim:

1. An improved clamp latch for a clamp having
   a loop portion adapted to circumferentially pass around an elongated object to be held thereby, wherein said loop portion terminates at each end in feet adapted to abut each other when in locked position,
   each of said feet having a latching element thereon cooperatively associated and adapted for engagement with its associated latching element on the other of said feet to fixedly retain said loop portion relative to said object to be held thereby, said latching elements comprising tabs formed from the ends of said feet, said tabs extending laterally across said feet, said tabs being recessed from the planes of their associated feet to permit abutting engagement therebetween.

2. A clamp latch as set forth in claim 1, one of said tabs extending laterally inwardly in one direction from one edge of one of said feet, the other of said tabs extending laterally inwardly in the other direction from the other edge of the other of said feet.

References Cited

UNITED STATES PATENTS

| | | | |
|---|---|---|---|
| 759,045 | 5/1904 | Tracy | 24—256 |
| 2,338,006 | 12/1943 | Morehouse | 248—74 |
| 2,404,473 | 7/1946 | Chunn | 248—74 |
| 2,655,703 | 10/1953 | Flora | 24—16 |
| 2,692,746 | 10/1954 | Thomas | 248—74 |

ROY D. FRAZIER, Primary Examiner

J. FRANKLIN FOSS, Assistant Examiner

U.S. Cl. X.R.

24—73, 81, 262, 279